United States Defensive Publication [19] (H) [11] T104,904

VanderValk [43] Dec. 4, 1984

[54] ELECTROPHOTOGRAPHIC IMAGING METHOD

[76] Inventor: Paul D. VanderValk, Kodak Park Division, Rochester, N.Y. 14650

[21] Appl. No.: 585,645

[22] Filed: Mar. 2, 1984

[51] Int. Cl.[3] ..... G03G 13/22; G03G 5/14

[52] U.S. Cl. ..... 430/31; 430/56

[57] ABSTRACT

A method of forming electrostatic images on a photoconductive element is disclosed. The method entails imagewise-exposing the photoconductive layer in the element to actinic radiation passing in sequence through an integral screen and a transparent support spacing the screen from the photoconductive layer in the element.

1 Claim, No Sheets Drawing,

10 Pages Specification

The file of this unexamined application may be inspected and copies thereof may be purchased (849 O.G. 1221, Apr. 9, 1968).